Nov. 25, 1924.

M. L. DAVIS, JR 1,516,957

LOCOMOTIVE DRIVING GEAR

Filed Dec. 6, 1922

Inventor
Matthew L. Davis
By his Attorneys
Redding & Greeley

Nov. 25, 1924.
M. L. DAVIS, JR
1,516,957
LOCOMOTIVE DRIVING GEAR
Filed Dec. 6, 1922
3 Sheets-Sheet 2
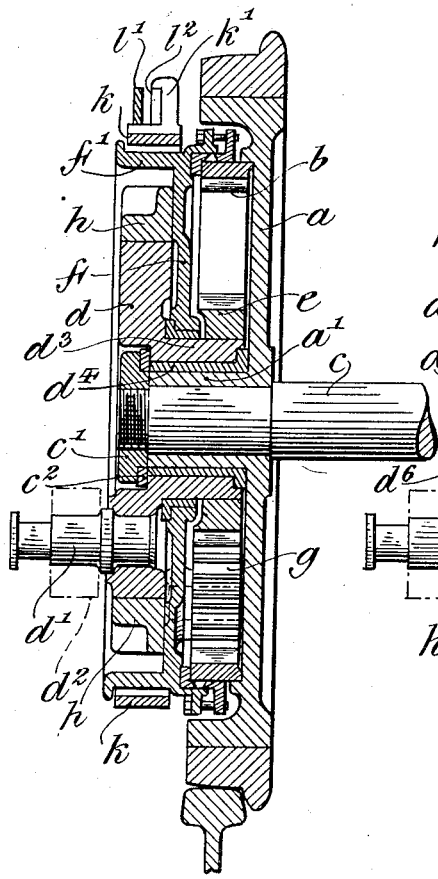
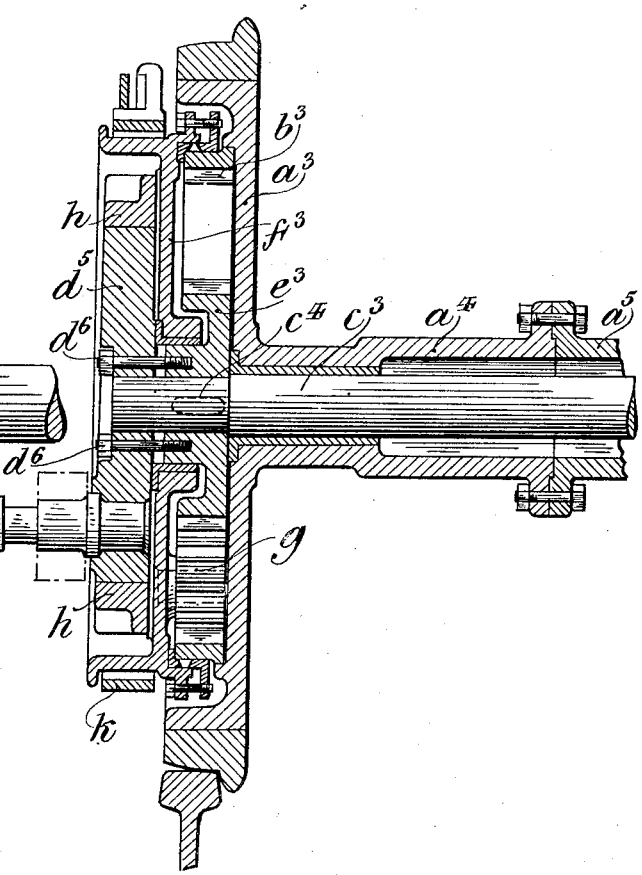
Inventor
Matthew L. Davis Jr
By his Attorneys
Redding & Greeley

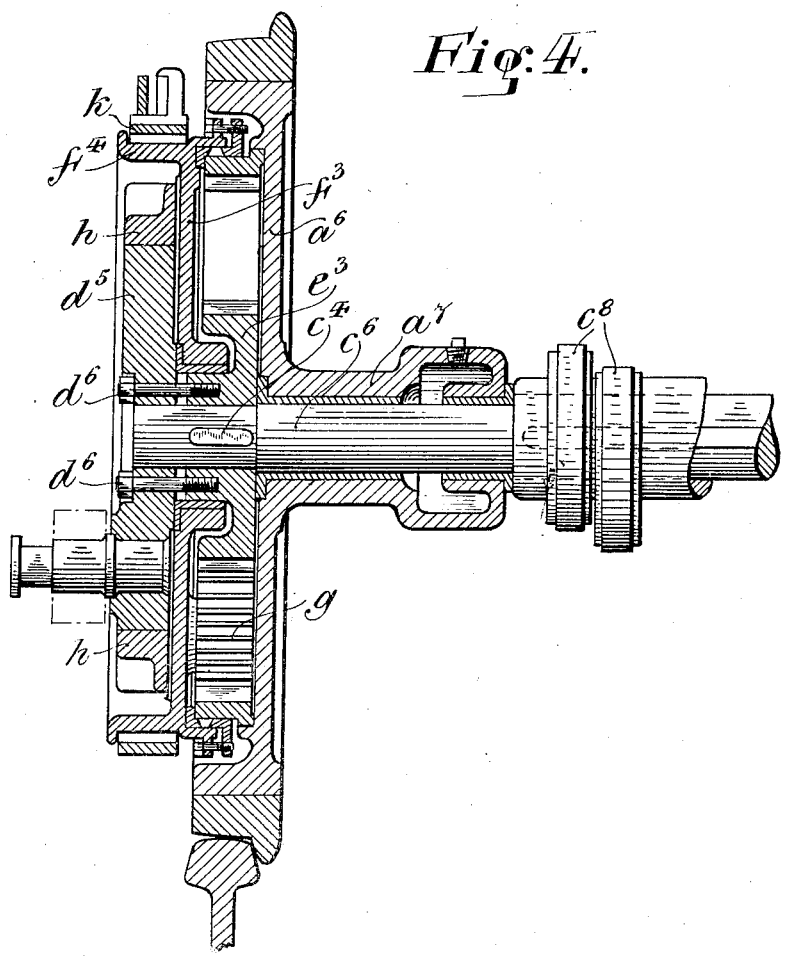

Patented Nov. 25, 1924.

1,516,957

UNITED STATES PATENT OFFICE.

MATTHEW L. DAVIS, JR., OF OAK GROVE, ALABAMA, ASSIGNOR OF ONE-HALF TO MATTHEW L. DAVIS, SR., OF OAK GROVE, ALABAMA.

LOCOMOTIVE DRIVING GEAR.

Application filed December 6, 1922. Serial No. 605,261.

*To all whom it may concern:*

Be it known that I, MATTHEW L. DAVIS, Jr., a citizen of the United States, residing in Oak Grove, Alabama, have invented certain new and useful Improvements in Locomotive Driving Gears, of which the following is a specification, reference being had to the accompanying drawing, forming a part hereof.

This invention relates to locomotive driving gear of the general character of that shown in Letters Patent of the United States No. 1,180,763, dated April 25, 1916 in which motion is imparted from the piston driven crank to the traction driving wheel through the intermediary of toothed gears. In the gearing described in said Letters Patent no provision was made for any changing of the gear ratio as between the crank driven member and the traction wheel so that the power of the locomotive was measured by the torque effort required to overcome the inertia of the locomotive and the train in starting from a state of rest, although much less power would be required in keeping the train in motion when once started. Consequently there was a loss of economy in the design of the locomotive. It is the purpose of the present invention to overcome the loss of economy by providing for a change in the gear ratio without, however, requiring disengagement or re-engagement of toothed gears which would be practically inadmissible in railroad practice. In accordance with the invention the intermediate gears, through which motion is imparted from the crank driven gear to the traction wheel, are mounted on a carrier which can be held from rotation in starting, so as to secure the desired increase of power, and can be released so as to rotate with the crank driven member and the traction gear so as to provide for direct drive in continuing the movement of the train after it has been started. The invention will be more fully explained hereinafter with reference to the accompanying drawings in which it is illustrated and in which—

Figure 2 is a view in section on the plane indicated by the broken line 2—2 of Figure 1.

Figures 3 and 4 are views generally similar to Figure 2 but showing slightly different applications of the invention.

Figure 1:
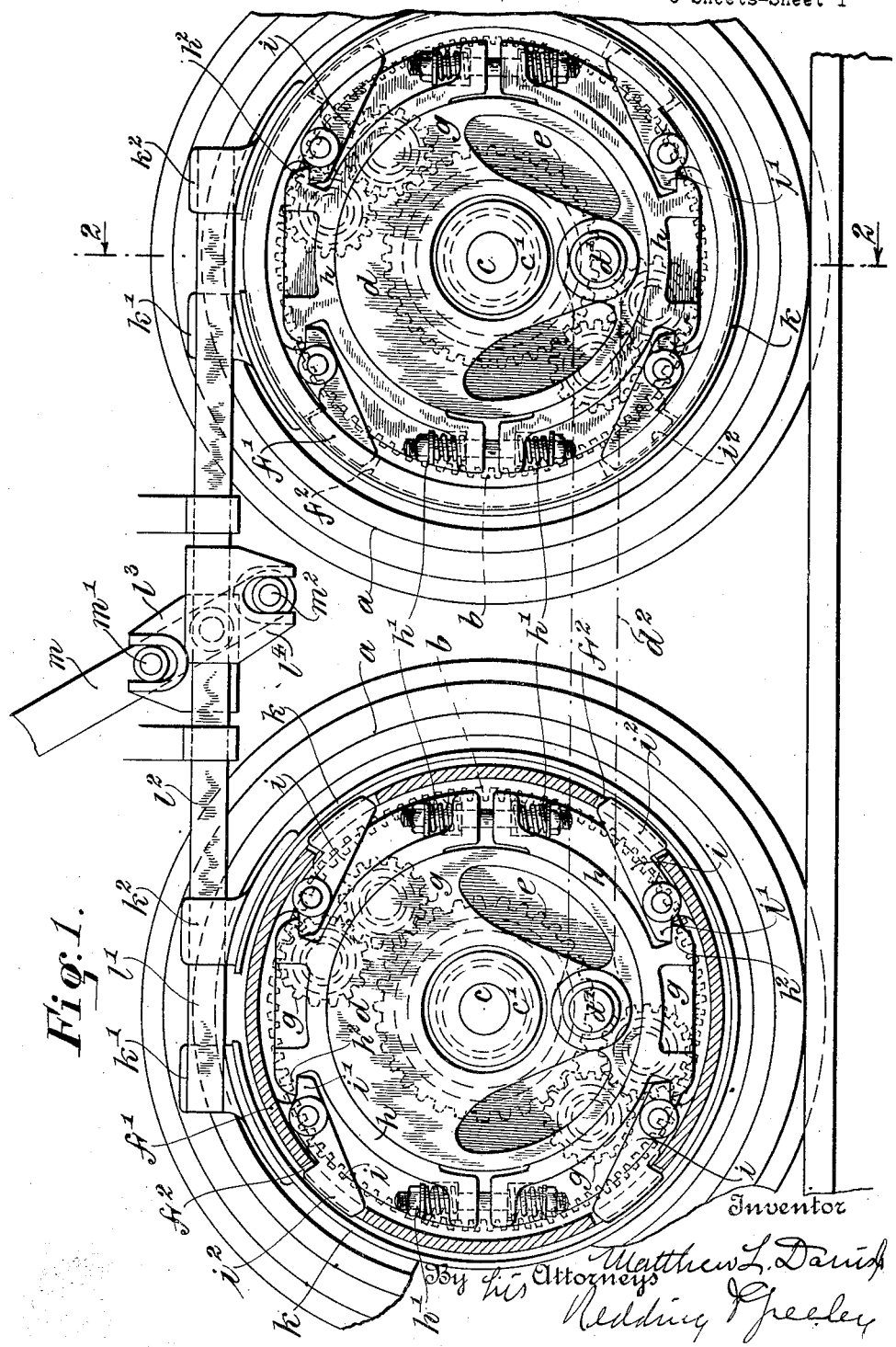
Figure 1 is a view in elevation, partly in section and partly broken away, showing two traction wheels equipped with a convenient and suitable embodiment of the invention.

Referring first to the application of the invention illustrated in Figures 1 and 2, it will be seen that the traction wheel $a$, preferably recessed, is provided with a traction driving gear $b$ which is preferably an internal gear. In this instance the traction wheel is fixed on the axle $c$, being preferably shrunk thereon, having an extended, sleeve-like hub $a'$ which furnishes a bearing for a crank driven member $d$, having a crank pin $d'$ for connection in the usual manner, not necessary to be shown herein, to the piston of the usual cylinder on the corresponding side of the locomotive. In the present instance two traction wheels $a$ are shown. The construction of the two traction wheels and the co-operating parts is identical, the two crank members $b$ being connected as by a connecting rod $d^2$ shown in broken lines in Figure 1.

The crank member $d$ is shown as having an extended hub $d^3$ which is rotatably mounted, through the intermediary of the bushing $d^4$, on the hub $a'$ of the traction wheel. A nut $c'$ and washer $c^2$ are shown as applied to the axle for the purpose of maintaining the parts in proper operative relation.

On the hub $d^3$ of the crank driven member $d$ is fixed, as by shrinking, a crank driven gear $e$ and mounted loosely on the hub $d^3$ of the crank member $d$, is a carrier $f$ which supports the intermediate pinions $g$ by which motion is imparted from the crank gear $e$ to the traction gear $b$. In the construction shown the intermediate gears $g$ are arranged in intermeshing pairs, the pinions of each pair being in mesh respectively with the crank gear $e$ and the traction gear $b$. Provision is made whereby the carrier $f$ can be made to rotate with the crank member, in which case the drive from the crank member to the traction wheel is direct, the ratio being 1:1, or can be released from the crank member, in which case the gear ratio as between the crank member and the traction wheel is the ratio of gears $e$ and $b$. The means for controlling the relation of the carrier to the crank member will now be described.

The cylindrical crank member $d$ is embraced by a split band $h$, the members of which are normally held in driving engagement with the crank member by ordinary spring devices as at $h'$. Each band member is also provided with overhanging lugs $h^2$ engaged by the toes $i'$ of dogs $i$ which are pivotally hung on the inside of the overhanging flange $f'$ of the carrier $f$. The heels $i^2$ of the dogs $i$ project outwardly through openings $f^2$ formed therefor in the flange $f'$. Embracing the flange $f'$ is a band $k$ the ends of which may be drawn together or separated by suitable means. As shown the two end blocks $k'$ and $k^2$ of the band $k$ are secured respectively to parallel bars $l'$ and $l^2$ which are supported for longitudinal movement and carry respectively notched lugs $l^3$ and $l^4$ engaged by the studs $m'$ and $m^2$ of a suitable operating lever $m$.

When the ends of the band $k$ are drawn together the band not only engages the flange $f'$ of the carrier $f$ and holds the carrier from rotation but it presses inward the heels $i^2$ of the dogs $i$ so that the toes $i'$ disengage the band members $h$ from the crank member $d$. Under this condition the carrier $f$ is stationary and the crank gear $e$ drives the traction gear $b$ through the intermediate pinions $g$ at a speed which is determined by the gear ratio of the gears $e$ and $b$. When, however, the parts are in the position shown in Figure 1, the carrier $f$ rotates with the crank member and therefore with the gear $e$ so that the pinions $g$ can serve merely to connect directly the gears $e$ and $b$ and the drive is then direct.

In the embodiment of the invention illustrated in Figure 3 the traction wheel $a^3$ is not fixed on the axle $c^3$ but is mounted loosely thereon, having a long sleeve hub $a^4$ which is fastened to a similar sleeve hub $a^5$ of the opposite wheel on the same axle so that the two traction wheels shall turn together. In this instance the crank member $d^5$ is secured, as by bolts $d^6$, to the crank gear $e^3$, which is keyed to the axle $c^3$, as indicated at $c^4$. The carrier $f^3$, which supports the transmitting pinions $g$, as before, is mounted on the hub of the crank gear $e^3$ and is operatively and releasably connected to the crank member $d^5$ by a split band $h$ which is itself controlled as before, through dogs not shown in Figure 3, by the band $k$ as before. The transmitting pinions $g$ supported by the carrier $f^3$ mesh with the traction gear $b^3$ and with the crank or driving gear $e^3$ as before. In all respects other than those noted above the construction, arrangement and operation are as described with reference to Figure 2.

In the embodiment of the invention illustrated in Figure 4 the traction wheel $a^6$ is mounted loosely on the axle $c^6$, having a long sleeve hub $a^7$. In this instance the axle is provided with inside eccentrics $c^8$ and the two opposite traction wheels on the same axle are not connected together. In all other respects the construction is the same as that described with reference to Figure 3, the crank member $d^5$ being secured by bolts $d^6$ to the crank or driving gear $e^3$, which is keyed on the axle $c^6$, as indicated at $c^4$ while the intermediate pinions $g$ are supported by the carrier $f^3$ which is engaged with the crank member $d^5$ by the split band $h^6$ and has its flange $f^4$ adapted for co-operation with the band $k$.

Various other arrangements and combinations of parts will readily suggest themselves and it is to be understood that except as pointed out in the claims the invention is not limited to any particular construction shown and described herein.

I claim as my invention:

1. The combination of an axle, a traction wheel, a traction gear, a driving member, a driving gear, intermediate gearing between the driving gear and the traction gear, a rotatable carrier for the intermediate gearing, and means to connect the carrier releasably and operatively with the driving member.

2. The combination of an axle, a traction wheel, a traction gear, a driving member, a driving gear, intermediate gearing between the driving gear and the traction gear, a rotatable carrier for the intermediate gearing, means to connect the carrier releasably and operatively with the driving member, and means to hold the carrier from rotation when it is released from the driving member.

3. The combination of an axle, a traction wheel fixed on the axle, a traction gear fixed on the traction wheel, a driving member rotatable independently of the traction wheel and gear, a driving gear fixed to the driving member to rotate therewith, intermediate gearing between the driving gear and the traction gear, a rotatable carrier for the intermediate gearing, and means to connect the carrier releasably and operatively with the driving member.

4. The combination of an axle, a traction wheel fixed on the axle, a traction gear fixed on the traction wheel, a driving member rotatable independently of the traction wheel and gear, a driving gear fixed to the driving member to rotate therewith, intermediate gearing between the driving gear and the traction gear, a rotatable carrier for the intermediate gearing, and means to hold the carrier from rotation at will.

5. The combination of an axle, a traction wheel fixed on the axle, a traction gear fixed on the traction wheel, a driving member rotatable independently of the traction wheel and gear, a driving gear fixed to the driving member to rotate therewith, intermediate gearing between the driving gear and the traction gear, a rotatable carrier for the intermediate gearing, means to connect the carrier releasably and operatively with the driving member, and means to hold the carrier from rotation when it is released from the driving member.

6. The combination of an axle, a traction wheel, a traction gear, a crank member mounted concentrically with the traction wheel and gear, a driving gear fixed to the crank member to rotate therewith, intermediate gearing between the driving gear and the traction gear, a rotatable carrier for the intermediate gearing, and means to connect the carrier releasably and operatively with the driving member.

7. The combination of an axle, a traction wheel, a traction gear, a crank member mounted concentrically with the traction wheel and gear, a driving gear fixed to the crank member to rotate therewith, intermediate gearing between the driving gear and the traction gear, a rotatable carrier for the intermediate gearing, means to connect the carrier releasably and operatively with the driving member, and means to hold the carrier from rotation when it is released from the driving member.

8. The combination of an axle, a traction wheel, a traction gear, a driving member, a driving gear, intermediate gearing between the driving gear and the traction gear, a rotatable carrier for the intermediate gearing, a split, spring pressed band embracing the driving member, a dog mounted on the carrier in operative relation with the split band, and means to actuate the dog to disengage the band from the carrier.

9. The combination of an axle, a traction wheel, a traction gear, a driving member, a driving gear, intermediate gearing between the driving gear and the traction gear, a rotatable carrier for the intermediate gearing, said carrier having an extended flange, means to connect the carrier operatively with the driving member, and means to co-act with the flange of the carrier to hold the same from rotation.

10. The combination of an axle, a traction wheel, a traction gear, a driving member, a driving gear, intermediate gearing between the driving gear and the traction gear, a rotatable carrier for the intermediate gearing, said carrier having an extended flange, a split, spring pressed band embracing the carrier, a dog mounted on the flange of the carrier to actuate the band to disengage it from the carrier, a band embracing the flange of the carrier and adapted to co-act with the dog to disengage the first named band from the driving member, and means to control the application of the last named band.

This specification signed this 2nd day of December A. D. 1922.

MATTHEW L. DAVIS, Jr.